Figure 1:
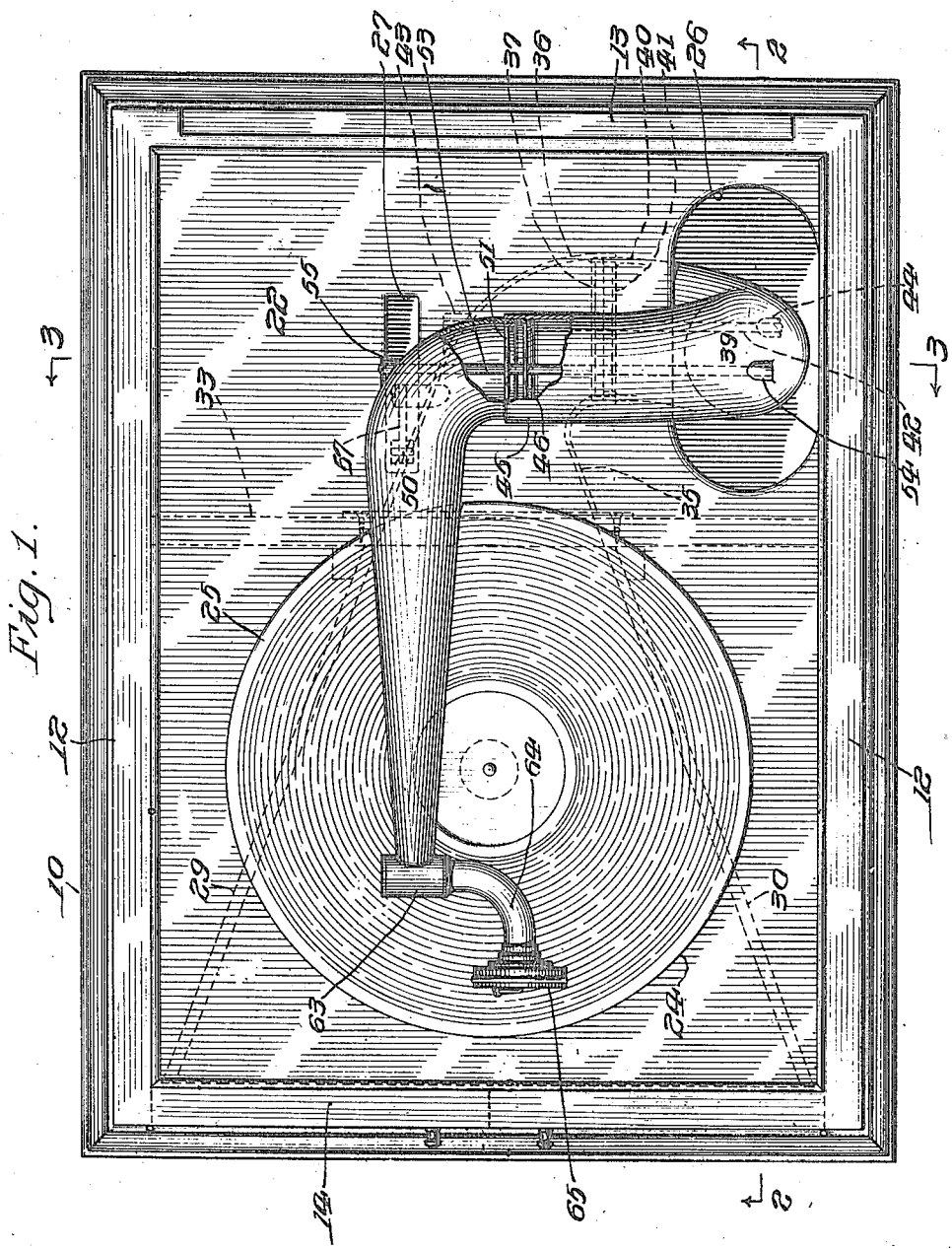

W. N. DENNISON.
TALKING MACHINE.
APPLICATION FILED JULY 31, 1911.

1,152,401.

Patented Sept. 7, 1915.
6 SHEETS—SHEET 1.

WITNESSES
F. J. Hartman.
Clifton C. Caldwell

INVENTOR
Wilburn N. Dennison.

BY

ATTORNEY

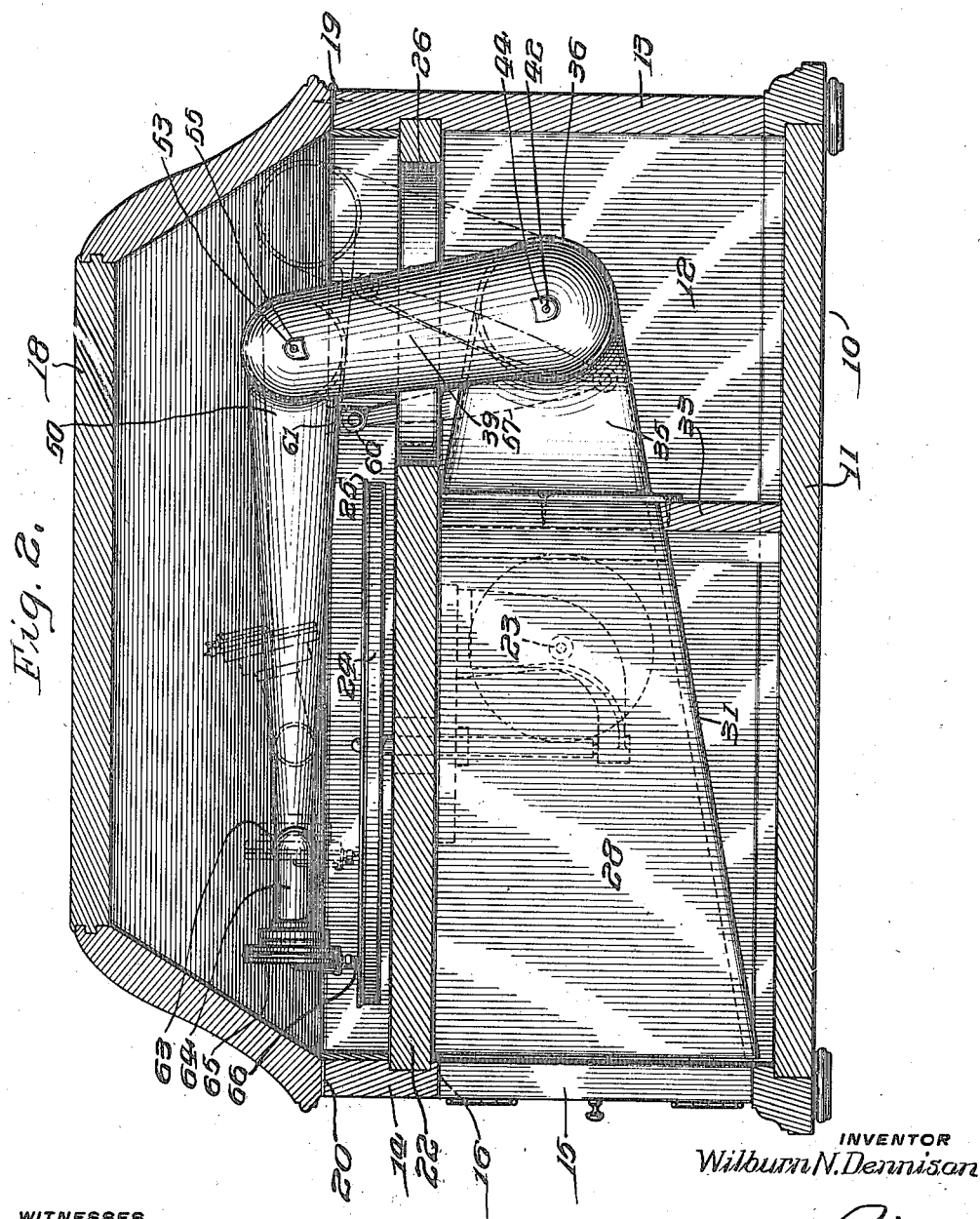

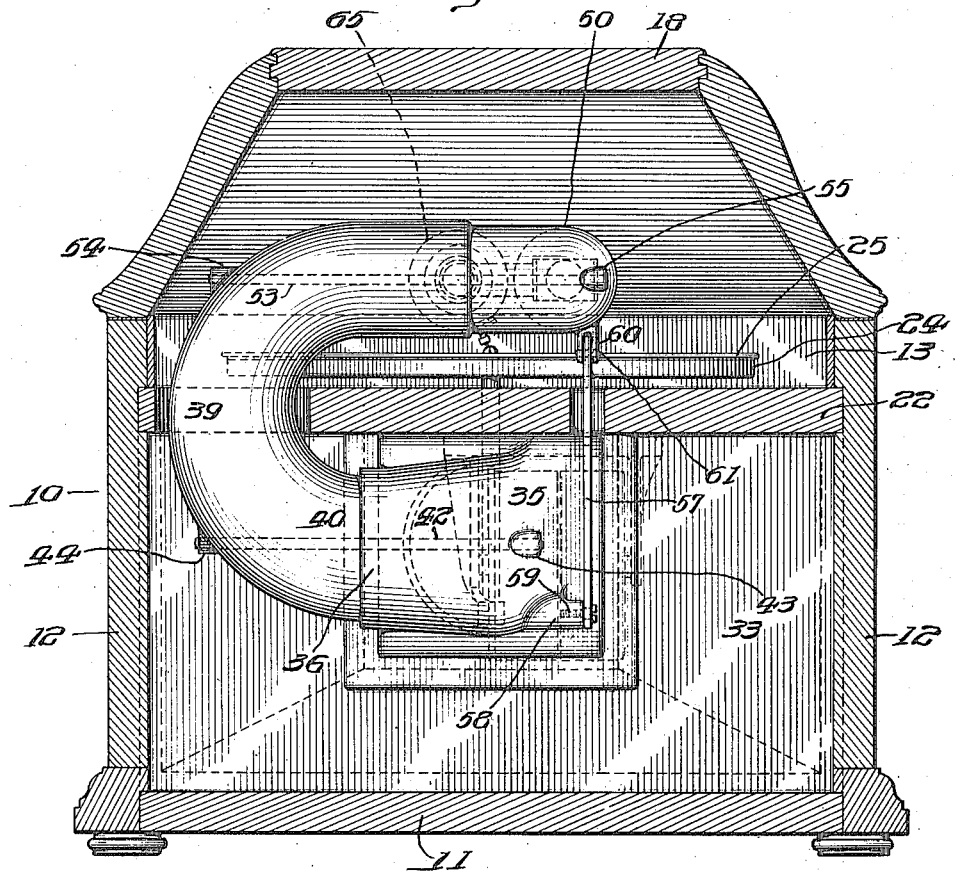

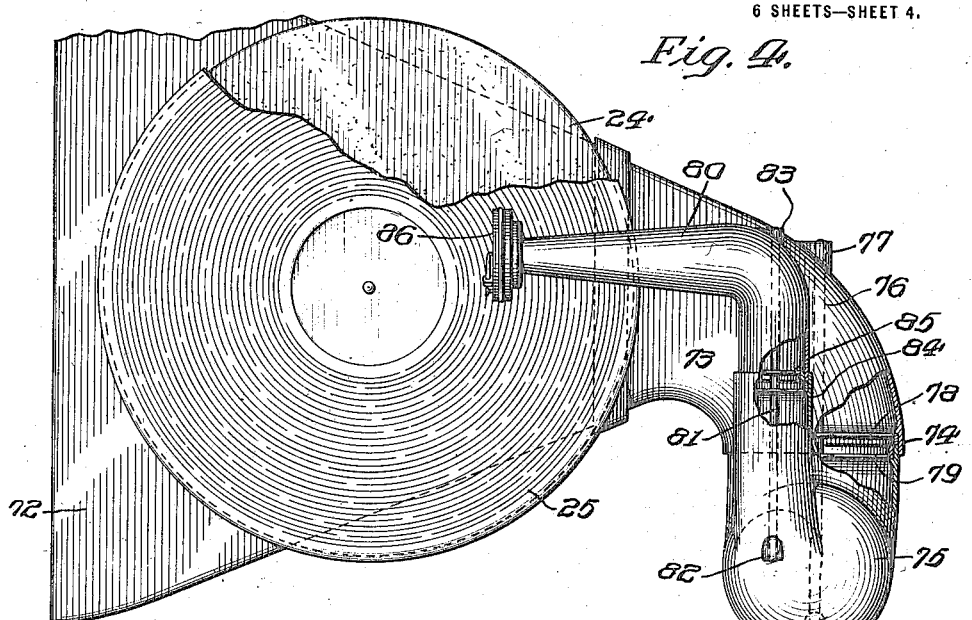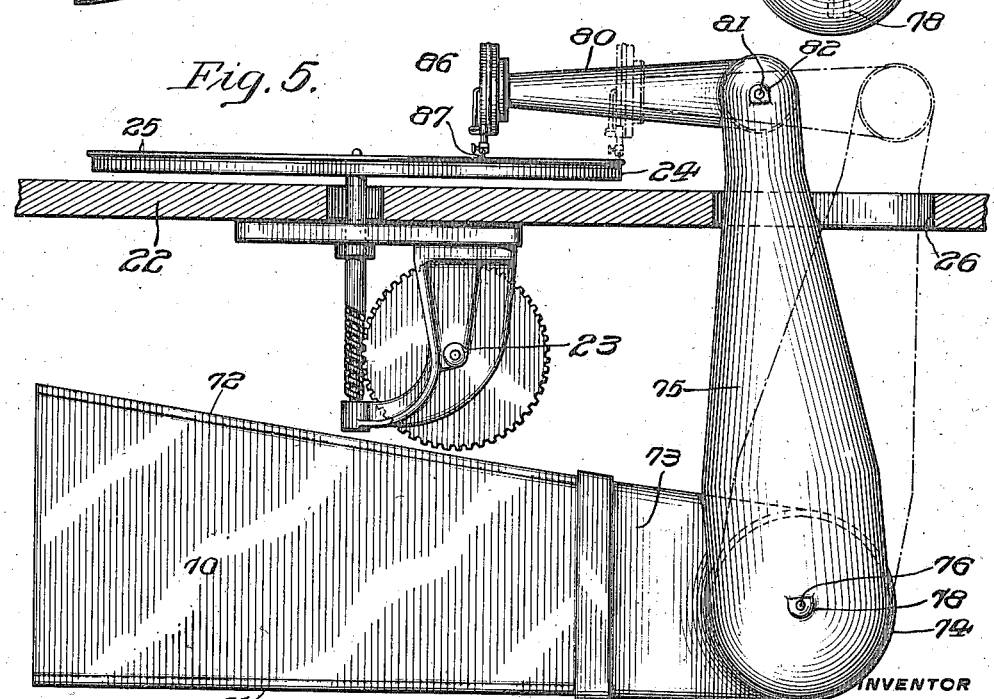

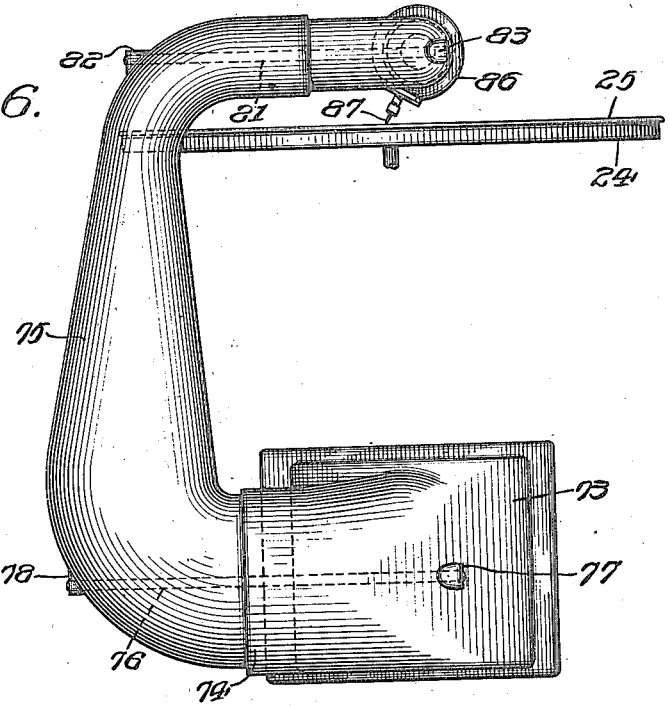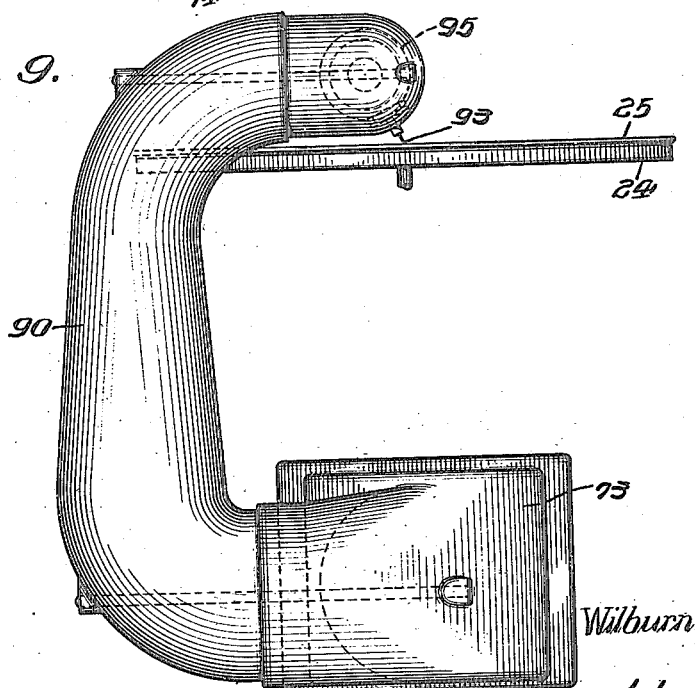

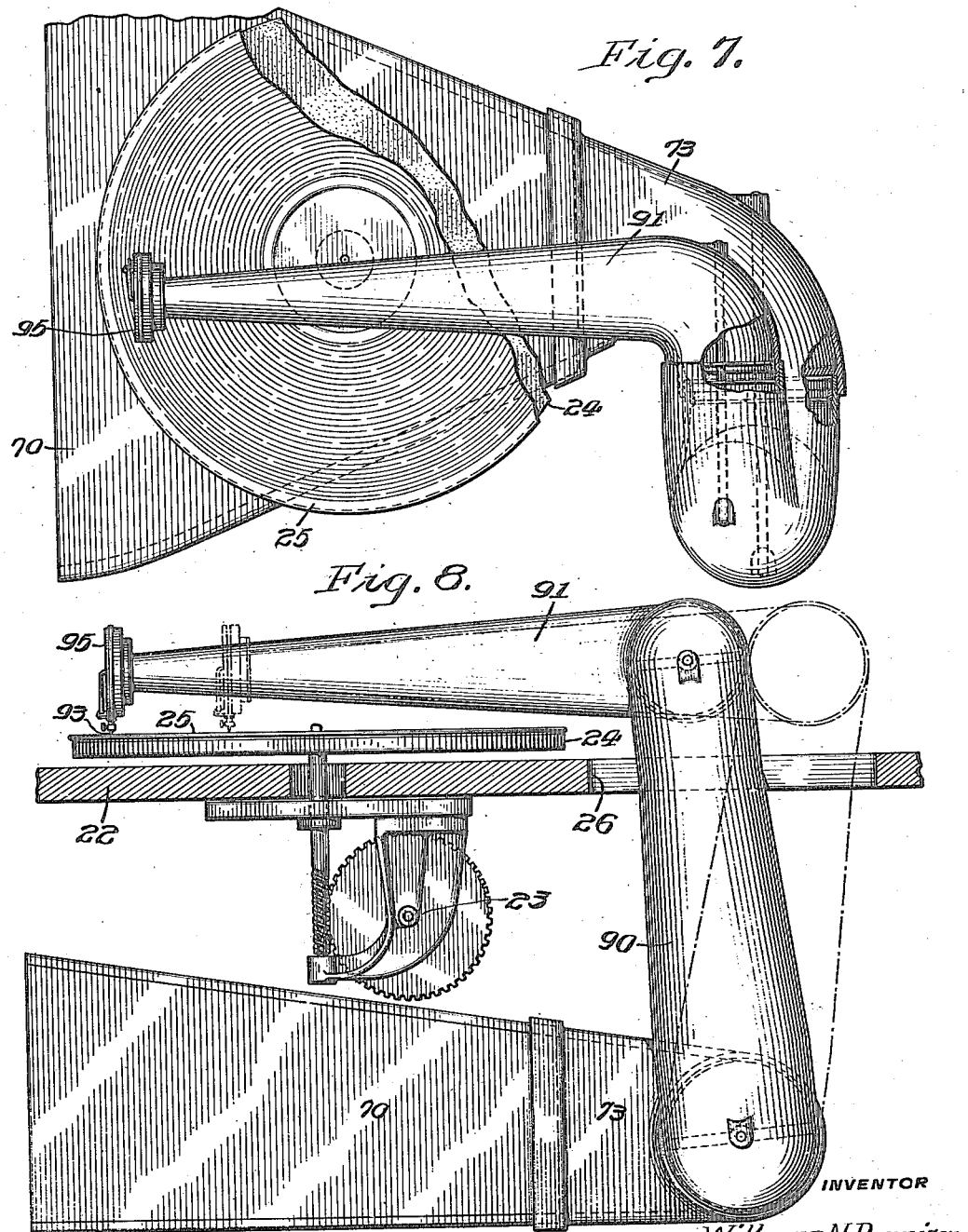

UNITED STATES PATENT OFFICE.

WILBURN N. DENNISON, OF MERCHANTVILLE, NEW JERSEY, ASSIGNOR TO VICTOR TALKING MACHINE COMPANY, A CORPORATION OF NEW JERSEY.

TALKING-MACHINE.

1,152,401.  Specification of Letters Patent.  Patented Sept. 7, 1915.

Application filed July 31, 1911. Serial No. 641,640.

*To all whom it may concern:*

Be it known that I, WILBURN N. DENNISON, a citizen of the United States, and a resident of the borough of Merchantville, in the county of Camden, State of New Jersey, have invented certain new and useful Improvements in Talking-Machines, whereof the following is a specification, reference being had to the accompanying drawings.

This invention relates to talking machines, and particularly to the sound transmitting or conveying mechanism for directing and delivering the sound waves generated by a sound reproducer, which is supported to be freely moved across a sound record disk by the contact of a stylus or needle with the sound reproducing line thereon, and may conveniently be applied to the well-known type of disk talking machine in which the hollow sound arm is pivoted to swing over the sound record in a plane parallel thereto.

The principal objects of this invention are, to provide a talking machine with a sound conveyer which forms a relatively long sound amplifier for the reverberation of the sound waves directed therethrough, and which is capable of inclosure by the walls of a talking machine cabinet of relatively small dimensions; to provide a sound conveyer having articulated sections telescopically connected for relative oscillation about axes which are common to the contiguous ends of adjacent sections; to provide means to effect a substantially parallel motion to the section comprising the free end of said sound conveyer, whereby the stylus is directed to traverse a rectilinear path over the sound record disk, radial to the axis of the turn-table, and whereby the longitudinal axis of the stylus is maintained in a plane which is substantially normal to the face of the sound record disk, and which is tangent to the successive convolutions of the sound producing line thereon at a point coincident with the point of the stylus; and to provide a sound conveyer with an articulated laterally extended section pivotally connecting the movable and stationary portions of the sound conveyer together.

Other objects of this invention are, to provide a sound conveyer wherein the axis of the return-bend may be disposed in close proximity to the periphery of the sound record disk without shortening said conveyer; and to provide a sound conveyer which may support a sound reproducer in such relation to the turn-table that the stylus may coact with that portion of the sound record disk lying farthest from, or nearest to the pivotal axis of said conveyer.

This invention further includes all of the various novel features of construction and arrangement hereinafter more definitely specified.

The form of this invention hereinafter described provides a talking machine of the type preferably provided with means for rotating a sound record disk, with a sound conveyer comprising an inclosed stationary sound amplifier having a laterally disposed inlet, an articulated laterally extended section forming a return-bend, which is pivotally connected, preferably in telescopic relation, with said stationary amplifier and with a horizontally extending tone arm, which carries the sound reproducer at its free end, and which is itself supported for reciprocation in a substantially rectilinear path by the articulated sections and by a link pivoted at its respectively opposite ends to the amplifier and to said tone arm, on axes parallel with the pivotal axes at the respectively opposite ends of the laterally extended section, the relative positions of said pivotal axes being such as to substantially maintain the free end of the tone arm in a plane parallel with the sound record disk.

In the accompanying drawings, Figure 1 is a plan view of an inclosed talking machine having a sound conveyer constructed in accordance with this invention, the lid or cover of the inclosing cabinet being removed for convenience of illustration; Fig. 2 is a vertical longitudinal sectional view of the cabinet shown in Fig. 1, taken on the line 2—2 in said figure, and showing the inclosed mechanism in elevation; Fig. 3 is a transverse vertical sectional view of said cabinet, taken on the line 3—3 in Fig. 1, showing the inclosed mechanism in elevation; Fig. 4 is a fragmentary plan view of a modified form of sound conveyer constructed in accordance with this invention, and having a sound reproducer in coöperative relation with a sound record disk, the telescopic connections being broken out and shown in section, for convenience of illustration; Fig. 5 is a side elevational view of the structure shown in Fig. 4, a fragment of the cabinet being shown in section, for convenience of illustration; Fig. 6 is a rear elevation of the sound conveyer shown in Figs. 4 and 5, showing its coöperative relation with a sound record disk; Fig. 7 is a fragmentary plan view similar to Fig. 4, showing another form of sound conveyer constructed in accordance with this invention; Fig. 8 is a side elevation similar to Fig. 5, but showing the form of this invention illustrated in Fig. 7; and Fig. 9 is a rear elevation of the structure shown in Figs. 7 and 8.

Referring to the drawings, one embodiment of this invention comprises a cabinet 10 including a bottom wall 11, side walls 12, rear wall 13, front wall 14, having suitable doors 15 arranged to close the sound outlet aperture 16 therein, and a lid or cover 18 which is hinged at 19 to the upper edge 20 of the cabinet body. Extending horizontally within the cabinet walls, and slightly below the upper perimeter of said cabinet body, is a horizontally disposed partition 22, from which depends a motor 23, connected to rotate a turn-table 24 arranged above the partition 22 to carry a sound record disk 25, the partition 22 being provided with oblong apertures 26 and 27, through which the sound conveying mechanism extends as will appear hereinafter.

As best shown in Fig. 2, an amplifier 28 depends from the partition 22 and has outwardly flaring side walls 29 and 30 and a downwardly sloping bottom wall 31 embracing the motor 23. Adjacent to the rear of the amplifier 28, and disposed transversely within the cabinet, below the horizontal partition 33, is a vertically extending partition 33, which supports a rearwardly extending stationary amplifier section 35, whose walls converge rearwardly at substantially the same angle as the walls of the amplifier 28, and merge into a laterally extending cylindrical portion 36, forming a circular opening in which is fitted a spider-frame 37. Projecting laterally and extending upwardly from the cylindrical portion 36 or smaller end of the amplifier section 35, and communicating therewith, is a movable tubular section or support 39, which is substantially U-shaped, as best shown in Fig. 3, and has a lower horizontal cylindrical end 40 fitted in telescopic relation within the cylindrical portion or end 36 of the stationary amplifier section 35, and is provided with a spider-frame 41 disposed therein adjacent to the end thereof. This movable tubular section 39 is connected in oscillatory relation with the stationary amplifier section 35 by a horizontal rod or shaft 42, which is mounted in suitable bearing bosses 43 and 44, projecting exterior to the respective sections 35 and 39, and which extends through both of the spiders 37 and 41 in said respective sections, whereby the free relative oscillation of said sections is effected upon a common axis. This movable tubular section 39 tapers upwardly from its lower end and terminates in a transversely extending substantially cylindrical upper end 45 in which is fitted a spider-frame 46, this upper end being spaced slightly above the plane of the disk record 25. Spaced above the turn-table 24 is a substantially horizontal tapering tone arm 50, the major portion of which is preferably substantially straight and arranged longitudinally within the cabinet 10, and the larger end of which is curved longitudinally through an arc of 90 degrees and terminates in a horizontal cylindrical portion which telescopes loosely in the upper cylindrical end of the tubular support 39. A spider-frame 51 is disposed within the cylindrical portion of the larger end of the tone arm 50. The larger end of the tone arm 50 and the upper end of the tubular section 39 are pivotally connected by a horizontal rod or shaft 53, which extends through the spider 46 and 51 and which is mounted in suitable bearing bosses 54 and 55 provided therefor exteriorly on the tone arm 50 and on the tubular support 39, whereby these members are connected to oscillate with respect to each other about a common horizontal axis coinciding with the longitudinal axis of the rod 53.

The tone arm 50 is maintained in a substantially horizontal plane by a link 57, which, as best shown in Figs. 2 and 3, is pivotally connected at its respectively opposite ends with a boss 58 on the amplifier section 35 by a stud 59, and with a bifurcated lug 60 on the tone arm 50 by a pintle 61. The link 57 may be disposed in substantially parallel relation to a plane coinciding with the axes of the shafts 42 and 53, so as to maintain the tone arm 50 in parallel relation to the plane of the turn-table 24, but it has been found by experiment that the location of the pivotal axes of the link 57 may be varied as desired so long as the outer free end of the section 50 is maintained in a plane parallel to the plane of the turn-table 24 in any position of reciprocation of said section. The free end of the section 50 may be conveniently provided with the transversely extending cylindrical barrel 63, into which is telescopically fitted for oscillation, an outwardly curved tubular neck 64, having its outer free end arranged to receive a sound reproducer 65, which is maintained thereby in such position that the point of the stylus 66 carried by the reproducer 65 is directed in a rectilinear path, radially with respect to the axis of the turn-table 24, and the longitudinal axis of the stylus is maintained in oblique relationship and at a substantially constant angle with respect to the plane of the turn-table and in a plane substantially perpendicular to the plane of said turn-table, and progressively tangential with respect to the successive convolutions of the sound line of a sound record disk carried thereby.

It is to be noted that in the sound conveyer above described, the U-shaped return-bend or section 39 may be disposed in close proximity to the periphery of the turn-table 24, whereby the cabinet may be comparatively short, and in view of the fact that the tone arm 50 extends across the turn-table, and the stylus needle 66 coöperates with the sound record disk, at the region of the disk most remote from the pivotal axis of the tone arm 50, the structure affords, within a relatively small space, a relatively long sound conveyer for the reverberation and amplification of the sound waves directed therethrough.

In the form of this invention shown in Figs. 4, 5 and 6, the sound amplifier 70 is supported independently of the partition 22, preferably by attachment to the inclosing cabinet (not shown), and is disposed below the motor 23, having its lower wall 71 substantially parallel with the partition 22 and its upper wall 72 extending below the motor and obliquely upwardly toward the delivery end of the amplifier.

In the latter form of this invention the amplifier 70 is attached to its rearwardly extended section 73, whose walls adjacent to said amplifier are disposed in alinement therewith, and merge into a laterally extended cylindrical portion 74, forming the inlet orifice for said amplifier. Also, in this latter form, the movable tubular section or support 75 is similar to the movable tubular support 39, shown in Figs. 1, 2 and 3, but is of greater length, owing to the distance of the amplifier 70 from the partition 22. Said section 75 is connected to oscillate with respect to the section 73 of the amplifier by a horizontal rod or shaft 76, which is mounted in suitable bearing bosses 77 and 78 on the respective sections 73 and 75, and which extends through suitable spiders 78 and 79 disposed in said respective sections, adjacent to their opposed ends.

Extending horizontally from the upper end of the movable tubular section 75, is a tone arm 80 which is pivotally connected to the upper end of the section 75, preferably in telescopic relation, by a horizontal rod or shaft 81, which is mounted in bearing bosses 82 and 83 on the section 75 and tone arm 80 respectively, and which extends through suitable spiders 84 and 85 disposed in said section and said tone arm respectively, thereby connecting said tone arm sections for relative oscillation about a common horizontal axis. Mounted directly upon the free end of this tone arm 80 is a sound reproducer 86 which is maintained by the tone arm 80 in such relation to the sound record disk 25, that the point of its stylus needle 87 is directed in a rectilinear path coincident with the radius of said record disk, which is perpendicular to a vertical plane coincident with the fixed axis of oscillation of said section 75, the length of the tone arm 80 being such that the point of the stylus needle 87 is coöperative with the lines of the record disk 25, which lie between the axis of rotation of the record disk and a vertical plane coincident with the fixed axis of oscillation of the tubular support 75. It will be noted that by this construction, the parallel arrangement for supporting the free end of the horizontal tone arm, comprising the link 57, boss 58, stud 59, lug 60 and pintle 61, as shown in Figs. 1 and 2, may be omitted; the sound reproducer being directly attached to the free end of the tone arm 80. By this arrangement, however, it may be observed that, owing to the fact that the axis of the shaft or rod 81 travels in an arc whose center is the axis of the rod or shaft 76, the distance of the pivotal axis of the tone arm 80 from the plane of the turn-table will vary slightly as the tubular support 75 is oscillated, whereby a slight deviation of the plane of the stylus needle with respect to the sound record disk must necessarily occur, which deviation depends in degree upon the distance between the axes of the rods 76 and 81.

In the construction shown in Figs. 4, 5, and 6, the deviation of the plane of the needle with respect to the sound record disk 25 may be reduced by prolonging the tone arm to such an extent as to permit the stylus needle to coöperate with the sound lines of the disk 25 which are most remote from the vertical plane which coincides with the axis of oscillation of said arm. Such a construction is shown in Figs. 7, 8 and 9, wherein the movable tubular section 90 is pivotally connected to the stationary section 73 of the amplifier in the same manner as the movable tubular section 75 is connected to the stationary section 73 of the amplifier in Figs. 4, 5, and 6, and the tone arm 91 is pivotally connected to the upper end of the movable tubular section 90 in the same manner as the tone arm 80 is connected to the upper end of the movable tubular section 75 in Figs. 4, 5, and 6. The tone arm 91 extends across the turn-table 24 to such an extent as to permit the point of the stylus 93 of the sound reproducer 95, carried by the tone arm, to coöperate with the sound lines of the sound record disk 25 which are most remote from the vertical plane which coincides with the fixed axis of oscillation of the movable tubular section 90.

In many talking machines in general use the tone arm is pivoted to swing about a vertical axis and carries at its free end a sound reproducer the stylus of which is caused to swing over the sound record disk in a path coincident with the arc of a circle, the center of which coincides with the pivotal axis of said tone arm, whereby a plane normal to the tablet and coincident with the longitudinal axis of the stylus may possibly not coincide with planes passing through said pivotal axis of said tone arm and tangent to the convolutions of the sound reproducing groove on said record disk.

It has been found by experiment that it may be advantageous to direct the stylus in a rectilinear path radial to the axis of the turn-table, whereby the plane coincident with the longitudinal axis of the stylus and normal to the surface of the record disk is maintained in substantially constant tangential relation to the successive convolutions of the sound lines on the sound record disk.

In disk talking machines wherein the tone arm swings about a vertical axis, the stylus coöperates with the sound record disk on one side of a plane coincident with the axis of oscillation of said tone arm and the axis of rotation of the turn-table, and that in order to afford sufficient length of tone arm to be effective to obtain the best results from the sound waves directed therethrough, and to make the path of the stylus an arc of relatively large radius the axis of the tone arm is located at a considerable distance from the axis of the turn-table, whereby a relatively large cabinet must be provided to inclose such structure, whereas the forms of the invention herein shown and described provide a comparatively long sound conveyer which may be inclosed in a comparatively small cabinet.

It is evident that this invention is not limited to the precise details of construction and arrangement herein set forth, as it is obvious that various modifications may be made therein without departing from the features of the invention as defined in the appended claims.

Having thus described my invention, I claim:

1. A sound conveyer for talking machines, comprising a sound amplifier, a tone arm, and a tubular section comprising a return bend mounted to oscillate on a horizontal axis, said section having its opposite ends respectively fitted in pivotal relation with said tone arm and with said amplifier.

2. A sound conveyer for talking machines, comprising a sound amplifier, a tone arm movable in substantially the direction of its axis, and a tubular section comprising a return bend connected to said tone arm and to said amplifier and lying at all times in a plane perpendicular to a vertical plane coincident with the longitudinal axis of said tone arm.

3. A sound conveyer for talking machines comprising a sound amplifier, a tone arm, and a movable laterally extending tapered tubular section connected to said tone arm and comprising a return bend, said return bend being directly connected to said amplifier to oscillate with respect thereto on a horizontal axis.

4. A sound conveyer for talking machines, comprising a sound amplifier having a laterally disposed inlet, a laterally extending tubular section comprising a return bend pivotally connected to communicate with said inlet, and a tone arm movably connected to said return bend and communicating therewith.

5. A sound conveyer for talking machines, comprising a sound amplifier having a laterally disposed cylindrical inlet, a laterally extending tubular section comprising a return bend provided with a cylindrical end pivotally fitted for relative oscillation in said inlet, and a tone arm movably connected to said section and communicating therewith.

6. A sound conveyer for talking machines, comprising a sound amplifier having a laterally disposed inlet, a tone arm, and a laterally extending U-shaped section connected to said tone arm and pivotally connected with said amplifier.

7. A sound conveyer for talking machines, comprising an amplifier, a tone arm, a movable tubular section comprising a laterally disposed return bend, a pivot connecting said tone arm to said section, a pivot parallel to said first mentioned pivot and upon which said section is mounted to oscillate with respect to said amplifier, and means acting in a direction at all times substantially parallel with a plane coincident with the axes of said pivots and pivotally supporting said tone arm in a substantially horizontal plane.

8. A sound conveyer for talking machines, comprising an amplifier, a tone arm, a tubular section providing a laterally disposed return-bend connected to said tone arm and connected for oscillation relative to said amplifier, and means operative to direct the free end of said tone arm in a rectilinear path.

9. A sound conveyer for talking machines, comprising an amplifier, a tone arm, a tubular section providing a laterally disposed return-bend connected to said tone arm and connected for oscillation relative to said amplifier, and means operative to support said tone arm and to direct it in a substantially rectilinear path.

10. A sound conveyer for talking machines, comprising an amplifier, a tone arm, a tubular section providing a laterally disposed return-bend connected to said tone arm and connected for oscillation relative to said amplifier, and means operative to support said tone arm in a substantially horizontal position, and to direct its free end in a substantially rectilinear path.

11. A sound conveyer for talking machines, comprising an amplifier, a tone arm, a tubular section providing a laterally disposed return-bend connected to said tone arm and connected with said amplifier for relative oscillation, and substantially parallel motion means operative to support said tone arm for horizontal reciprocation, and to direct its free end in a substantially rectilinear path.

12. A sound conveyer for talking machines, comprising an amplifier, a tone arm, a tubular section providing a laterally disposed return-bend connected with said tone arm and with said amplifier, for relative oscillation, means operative to support said tone arm in horizontal position, and effective to direct the free end of said arm in a rectilinear path, and a pivoted connection carried by the free end of said arm, for carrying a sound reproducer.

13. A sound conveyer for talking machines, comprising an amplifier, a tone arm, a tubular section extended laterally, and forming a return-bend pivotally connected to said tone arm and said amplifier upon horizontal axes, and a link supporting said tone arm for horizontal reciprocation.

14. A sound conveyer for talking machines, comprising an amplifier, a tone arm, a laterally extended tubular section operative to oscillate with respect to said tone arm and with respect to said amplifier, and connected in telescopic relation with said tone arm and with said amplifier, a link supporting said tone arm horizontally, and operative to direct its free end in a substantially rectilinear path, and a laterally extending connection carried by the free end of said tone arm and arranged to support a sound reproducer.

15. A sound conveyer for talking machines, comprising an amplifier having a laterally extended cylindrical inlet, a tone arm having a laterally disposed cylindrical outlet, a tubular return bend having its opposite ends telescopically engaged in pivotal relation with said outlet and with said inlet respectively, and a sound reproducer carried by said tone arm and operative to direct the point of a stylus carried thereby in a rectilinear path.

16. In a talking machine, the combination with a cabinet, of a turn-table rotatable therein, and arranged to support a sound record disk, an amplifier disposed beneath said turn-table, a tone arm disposed above said turn-table, and a tubular section extended laterally, and forming a return-bend pivotally connecting said tone arm and said amplifier adjacent to the edge of said turn-table, the free end of said tone arm extending beyond the axis of said turn-table, and arranged to carry a sound reproducer, and to direct its stylus in a rectilinear path substantially radial to said turn-table, and to substantially maintain the plane of said stylus in normal relation to the sound record disk, and tangent to the successive convolutions of the sound lines on said disk.

17. In a talking machine, the combination with a cabinet, of a turn-table arranged to rotate therein, operative to carry a sound record disk, a sound amplifier, a tone arm having a section connected to said tone arm and projecting laterally and forming a return-bend pivotally connected with said amplifier on a horizontal axis, and a sound reproducer carried by the free end of said tone arm, and having its stylus directed in a rectilinear path, substantially coincident with a radius of said turn-table, said tone arm extending beyond the axis of said turn-table and operative to direct the stylus over that portion of the sound record disk which is most remote from the pivotal connection of said tone arm.

18. In a talking machine, the combination of an amplifier, a tone arm, and a tubular member uniting said amplifier and said tone arm and having swivel connections therewith, said swivel connections having parallel axes and said tubular member being free to turn on said axes to cause a substantially rectilinear movement of said tone arm.

19. In a talking machine, the combination of an amplifier, a tone arm, and a tubular member uniting said amplifier and tone arm and having telescopic connections therewith, said telescopic connections having parallel axes and said tubular member being free to turn on said axes to cause a substantially rectilinear movement of said tone arm.

20. A sound conveyer for talking machines, comprising an amplifier having an opening, a tone arm having a laterally disposed opening, and a unitary tubular member having a return bend with its opposite ends telescopically engaged in pivotal relation with the opening in said amplifier and tone arm respectively.

21. The combination of a hollow sound conveyer, a hollow amplifier, and a tubular section provided at its ends with openings coöperative respectively with said conveyer and said amplifier, said section being fitted to turn with respect to said conveyer about an axis coincident with the axis of one of said openings, said section being also fitted to turn with respect to said amplifier about an axis coincident with the axis of the other of said openings.

22. The combination of a hollow sound conveyer, a hollow amplifier, and a tubular section provided at its ends with openings coöperating respectively with said conveyer and said amplifier, said section being fitted to turn with respect to said conveyer about an axis coincident with the axis of one of said openings, said section being also fitted to turn with respect to said amplifier about an axis parallel with the said first-mentioned axis and coincident with the axis of the other of said openings.

In witness whereof, I have hereunto set my hand this 27th day of July, A. D., 1911.

WILBURN N. DENNISON.

Witnesses:
FRANK B. MIDDLETON, Jr.,
CHARLES F. WILLARD.